United States Patent [19]

MacNeal

[11] Patent Number: 4,500,177
[45] Date of Patent: Feb. 19, 1985

[54] METHOD AND DEVICE FOR CREATING SWITCHABLE REDUNDANCY WITH A MAGNETIC ELEMENT

[75] Inventor: Bruce E. MacNeal, Fullerton, Calif.

[73] Assignee: Litton Systems, Inc., Beverly Hills, Calif.

[21] Appl. No.: 375,330

[22] Filed: May 5, 1982

[51] Int. Cl.³ .............................................. G02F 1/09
[52] U.S. Cl. ......................................... 350/376; 365/2
[58] Field of Search ............... 350/376, 375, 377, 378; 204/192 M; 365/2, 35, 37; 360/114

[56] References Cited

U.S. PATENT DOCUMENTS 3,717,853  2/1973  O'Donnell et al. ...................... 365/2
4,012,724  3/1977  Hanson et al. .......................... 365/2

Primary Examiner—Bruce Y. Arnold
Assistant Examiner—William Propp

[57] ABSTRACT

A nonmagnetic substrate is shown having a magnetic film that has been separated into a grid-like pattern of spaces to form quadrilateral magnetic elements. The spaces are filled with conductors arranged generally in X and Y directions. Each quadrilaterally shaped magnetic post element has a first and second region of low anisotropy material compared to the high anisotropy material of the magnetic film. The first regions of low anisotropy material are located in one corner of the quadrilaterally shaped post elements while the second regions are located in the corner opposite the first regions. Alternate columns of magnetic post elements have the first and second regions of low anisotropy material in opposite corners defined by a first diagonal, while the remaining columns have the low anisotropy material in corners defined by the second diagonal. This arrangement permits redundant switching of each magnetic post element.

11 Claims, 4 Drawing Figures

METHOD AND DEVICE FOR CREATING SWITCHABLE REDUNDANCY WITH A MAGNETIC ELEMENT

FIELD OF THE INVENTION

The present invention relates to a method and device for creating switchable redundancy within a magnetic element and, more particularly, to an improved pattern of magnetic post elements upon a nonmagnetic substrate which permits each element to be switched by more than one set of coincident electrical conductors.

BACKGROUND OF THE INVENTION

It is well known that the direction of magnetization of a magnetic material can be reversed or switched by impressing an external magnetic field of opposite polarity upon the material. Typically, magnetic material may be placed upon a nonmagnetic substrate and then divided or separated by a grid-like pattern to create magnetic post elements. When electronic conductors are placed within the separations which form the gird-like pattern, electric currents may be passed through the conductors to generate a magnetic flux about each conductor. This flux is concentrated at the intersection of two conductors in two of the four quadrants formed by the intersection. Through the utilization of a low anisotropy material located within one of the two quadrants in which the flux is concentrated, it is possible to control which magnetic post element will be switched at each intersection.

The concept of placing a low anisotropy material within the high anisotropy material of a magnetic post element has been disclosed in a co-pending patent application, Ser. No. 320,819, filed Nov. 12, 1981, by Bruce E. MacNeal and William E. Ross, entitled "Altering The Switching Threshold Of A Magnetic Material," assigned to the same assignee as the present invention. In yet another co-pending application, the concept of increasing the density of the magnetic post elements by dividing the post elements along their diagonals has been discussed. See co-pending patent application Ser. No. 375,327, filed May 5, 1982, by William E. Ross entitled "Method And Device For Increasing The Density Of A Plurality Of Switchable Magnetic Elements."

The MacNeal and Ross patent applications mentioned above do not provide for redundancy within the magnetic system in the event that a magnetic post element should become defective due to early switching characteristics. Other defects might include optical defects within a magnetic post, reduced current sensitivity within a magnetic post which would prevent its switching, electrical shorts, and open-electrical conductors.

SUMMARY OF THE INVENTION

Accordingly, it is an object of the present invention to provide redundancy switching within a plurality of magnetic post elements.

Another object of the present invention is to provide a redundancy system which makes it possible to eliminate such defects as early switching of a magnetic post element, reduced current sensitivity within a magnetic post element or the problems caused by an open electrical conductor.

In accomplishing these and other objects, there is provided a transparent, nonmagnetic substrate upon which is placed a layer of transparent, magnetic material having a high anisotropy. The high anisotropy material is divided by a grid-like pattern of separations in the X and Y directions to form quadrilaterally shaped magnetic post elements arranged in horizontal rows and vertical columns. Electrically conductive elements are then deposited within the separations in the X and Y directions. Each quadrilateral magnetic post element has a first and second diagonal between the corners thereof. Located within one corner of each magnetic post is a first small region of low anisotropy material when compared to the high anisotropy material of a post element.

A second small region of low anisotropy material is then placed within the corner opposite the first region in each post element. Alternate rows of magnetic post elements are provided with the first and second region of low anisotropy material located in the corners identified by the first diagonal of a quadrilaterally shaped post element. The remaining alternate rows are then provided with the first and second small regions of low anisotropy material located in the corners identified by the second diagonal.

This arrangement permits a selected intersection of electrical conductors to magnetically switch a first small region of low anisotropy material within a selected magnetic post or, in the case of a fault, a second selected intersection to switch a second, small region within the same selected post element.

DESCRIPTION OF THE DRAWINGS

A better understanding of the objects and advantages of the present invention may be had after consideration of the following specification and drawings, in which.

DESCRIPTION OF THE PREFERRED EMBODIMENTS

Figure 1:
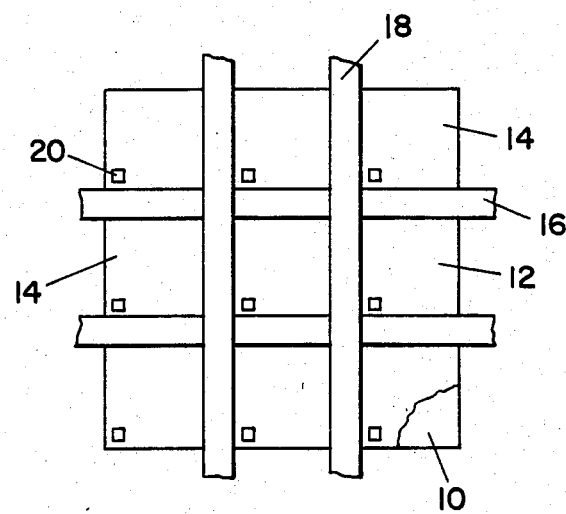
FIG. 1 is a plane view showing a nonmagnetic substrate, magnetic post elements, electrical conductors, and regions of low anisotropy material useful in describing the present invention.

Referring now to the drawings, FIG. 1 shows a nonmagnetic and optically transparent substance 10, which may be formed from a garnet material, such as gadolinium gallium garnet (GGG). Deposited upon the substrate 10 is a layer of transparent magnetic film material 12, which may be deposited by the liquid phase epitaxy method and which may be one of several transparent films that demonstrate magnetic domain characteristics. Such films may be created from iron garnet by substituting bismuth, aluminium or gallium and certain rare earth elements into the iron garnet. The magnetic film 12 must be transparent to electromagnetic energy; however, the nonmagnetic substrate 10 may be opaque when used in a reflective mode.

The magnetic film 12 may be grown in pattern of separations or deposited across the full surface of substrate 10 and then separated into a grid-like pattern by its removal from the substrate 10 by various methods including chemical etching, mechanical milling, or ion beam milling. In practice, actual removal need not occur at the point of separation. Rather magnetic film 12 may be separated by rendering it nonmagnetic from ion beam implantation. The patterns established by the removal of the film may be varied. In the preferred embodiment, however, the pattern is an orthogonal, grate-like pattern which separates the film 12 into a plurality of magnetic post elements 14 in the form of a quadrilateral or square.

It will be seen that the orthogonal pattern includes a first set of separations running in the Y direction or vertically down the face of the substrate 10, and a second set of separations running in the X direction or horizontally across the substrate. Placed within these separations, as by metal depositing, are a plurality of electrical conductors 16 which are deposited in the X direction. Next, a thin layer of a suitable insulation material is deposited over the conductors 16, especially in the areas where they will intersect with conductors deposited within the vertical separations. Electrical conductors 18 are then deposited in the vertical separations between the quadrilateral or square post elements 14. Conductors 16 and 18 could be deposited upon a second substrate of transparent, nonmagnetic material and then aligned with the separations in another embodiment of the present invention.

As seen in FIG. 1, the plurality of magnetic post elements 14 are provided with a small region of low anisotropy material 20 in the lower left-hand corner which is implanted, as by ion-implantation or laser annealing, in the surface of the high anisotropy material 12. As taught by the co-pending patent application, Ser. No. 360,810, filed Nov. 12, 1981, the exposure of the first region 20 to a flux field causes the direction of magnetization within the first region to change or rotate 180° thereby creating a domain wall. This domain wall, not shown, will then spread under the influence of the flux field established by the coincidence of conductors 16 and 18 until the wall reaches the interface between the first region 20 and the magnetic film 12 in quadrilaterally shaped post element 14. At this interface, the internal flux generated by the reversed direction of mangetization within the low anisotrophy material of region 20 is sufficiently strong enough to reverse the magnetization of the high anisotropy material in film 12. The reversal then moves across the magnetic film 12 within the post element 14 until a full reversal of the direction of magnetization has been accomplished.

The device shown in FIG. 1 may be subjected to several manufacturing problems. That is, the magnetic switching of the magnetic post element 14 may occur early due to defects within the material. Further, the post 14 may have optical defects caused by bubbles, impurities, or manufacturing error. The opposite of early switching is a reduced current sensitivity within a region of low anisotropy material 20 thereby preventing a magnetic post element 14 from changing its direction of magnetization. Additional problems are electrical shorts found at the intersections of conductors 16 and 18 or open lines caused by failures within the electrical conductors 16 and 18.

Figure 3:
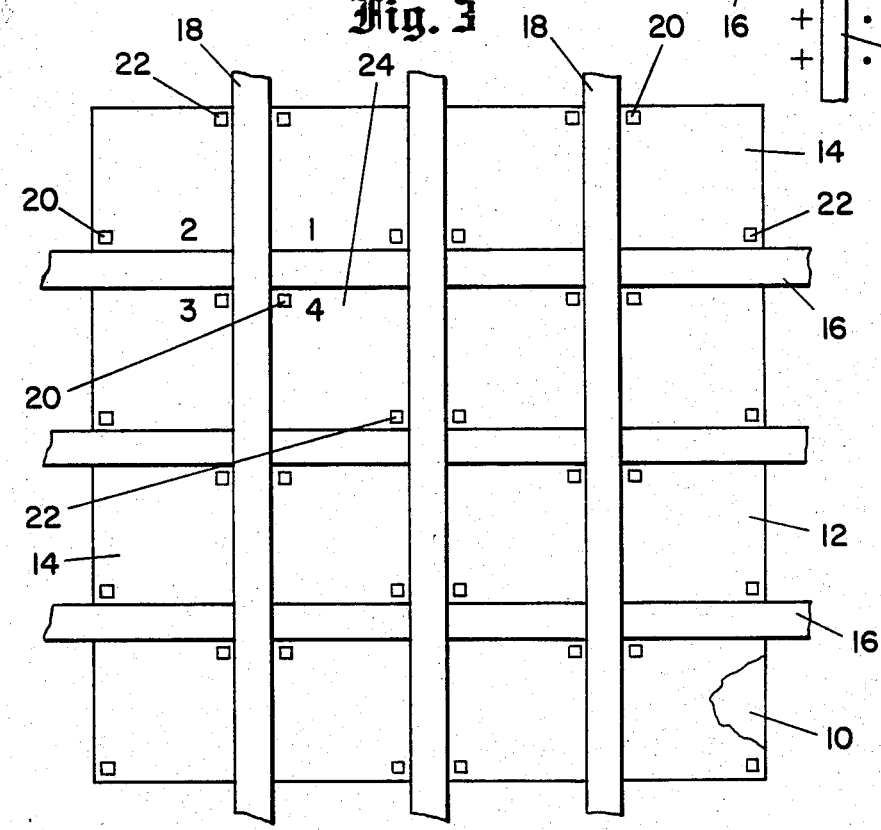
FIG. 3 is a plane view similar to FIG. 1 illustrating the present invention.

As seen in FIG. 3, it is possible to eliminate many of these faults. That is, magnetic switching defects caused by early switching or reduced current sensitivity and faults caused by open conductors may be eliminated through the utilization of a redundant magnetic post switching technique.

The redundancy is accomplished by adding a second small region of low anisotropy material 22 in each corner of the magnetic post elements 14 opposite the first region 20. It should be noted in FIG. 3, that the post elements 14 in the first, left-hand column have a first region of low anisotropy material 20 located in the lower, left-hand corners and a second region 22 located in the upper, right-hand corners so that a first set of diagonals passing across the quadrilaterals or squares formed by post elements 14 intersect the first and second regions of low anisotropy material 20 and 22 in the corners thus defined.

If the second row of post elements 14 was arranged with the first and second regions 20 and 22 of low anisotropy material in the same configuration, the switchable magnetic elements would not function properly.

Figure 2A:
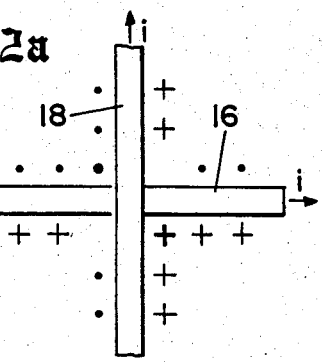
FIGS. 2a and 2b are schematic diagrams illustrating magnetic flux about a pair of intersecting conductors.
Figure 2B:
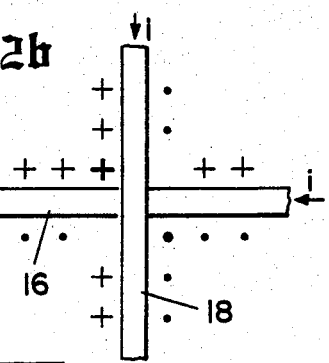

This can best be explained by referring to FIG. 2a where it will be seen that an electric current (i) passed through conductors 16 and 18 in a positive direction along the X and Y axes will create a magnetic flux about each conductor. In the four quadrants (1-4) formed by such an intersection of conductors, as shown best in FIG. 3, the flux in quadrant 1 will cancel since the flux around conductor 16 passes away from the reader, while the flux around conductor 18 passes toward you. However, in quadrant 2, the flux is passing toward the reader from both conductors 16 and 18 so that the flux is increased in this quadrant. Similarly, the flux in quadrant 3 is neutralized while the flux in quadrant 4 is increased in a direction passing away from the reader. Should the current in conductor 16 and 18 be reversed, as shown in FIG. 2b, the resultant flux is rotated 180°.

Thus, it will be seen in FIG. 3, that, if the magnetic post elements 14 in the second column have a first region 20 of low anisotropy material in the lower, left-hand corner like the first column, a current passing through the upper horizontal conductor 16 and the far, left-hand conductor 18 in the positive directions would generate a flux that affects both magnetic post elements 14 shown in the quadrants numbered 2 and 4. If this were permitted, there would be no way of independently controlling these elements. It becomes clear therefore that the redundant second region 22 must be located on the same side of one of the conductors at any given intersection as the first region 20. Therefore, it is necessary to vary the pattern of first and second regions 20 and 22 in alternate columns or alternate rows of the matrix shown in FIG. 3.

In operation, if it were desired to change the direction of magnetization of a magnetic post element 24 shown in the second row, second column, (or in quadrant 4 created by the intersection of the upper conductor 16 and the left-hand conductor 18) an electrical current (i) could be passed through those conductors in the positive direction. Assuming that all magnetic post elements shown in FIG. 3 were oriented with their magnetization flux pointing toward the reader, the current passing through the upper conductor 16 and left-hand conductor 18 would cause the flux in quadrant 4 to be reversed away from the reader. This electrically generated flux is strong enough to change the direction of magnetization within the first region of low anisotropy material 20 in the magnetic post element 24. As mentioned above, this change in the direction of magnetization within region 20 moves across the first region until it reached the interface between region 20 and the high anisotropy material 12 within post element 24. The presence of the reversed magnetic direction at the interface is strong enough to cause a reversal of the direction of magnetization within the high anisotropy material 12 even though the flux field generated by the intersection of conductor 16 and 18 is not. The reversed direction of magnetization will then continue to move across the surface of post element 24 until the full post element has reversed its direction of magnetization.

Assume that the first region 20 of low anisotropy material in post element 24 was faulty or that it had a very low anisotropy characteristic so that it switched its direction of magnetization earlier than desired. Assume further that the upper vertical conductor 16 is faulty due to an open short along its path. In this situation, the post element 24 may be switched by passing a current through the second, horizontal conductor 16 and the second vertical conductor 18. However, currents passing through these second conductors in the positive directions create the desired affect in the lower, right-hand quadrant formed by their intersection. To switch post element 24, it now becomes necessary to pass current through the second horizontal conductor 16 in a right to left direction while passing current through the second horizontal conductor 18 in a downward direction. This flux pattern, as shown in FIG. 2b, will generate the flux desired in the upper, left-hand quadrant to cause the switching of the second region 22 and the post element 24.

Similarly, if the first area of low anisotropy material 20 had a reduced current sensitivity so that it switched late, it would also be possible to switch to a new intersection utilizing the second region of low anisotropy material 22. The necessity of having a redundant switching capability within the matrix contemplated by the present invention will be understood when one considers that such matrix is several centimeters square; while each pixel formed by the magnetic post elements 14 is on the order of a few millimeters square. Thus, a few faulty post elements could require the full matrix to be scrapped. To prevent this, it is much more economical to rewire or reprogram the power supply which supplies the current to conductors 16 and 18.

While the matrix of magnetic post elements has been described as having quadrilateral or square posts 14 with orthogonal conductors 16 and 18, it will be understood that other configurations are possible within the teachings of the present invention. Further, but a single magnetic element with redundant switching characteristics may be considered within the present invention.

I claim:

1. A method for creating redundancy within a plurality of switchable magnetic post elements formed from a magnetic material upon a nonmagnetic support, comprising the steps of:
   placing a magnetic material having a high anisotropy upon said nonmagnetic material to form separations in said magnetic material and thus form said magnetic post elements;
   arranging said separations in a grid-like pattern having a first set of separations in a first direction and a second set of separations in a second direction to form said post elements into quadrilateral shapes;
   placing a conductive material in each of said grid-like separations in said first and second directions;
   placing a first region of material in said high anisotropy magnetic material which forms said post elements that has a low anisotropy relative to said high anisotropy of said magnetic post elements, said first region placed in a corner of each quadrilaterally shaped post element;
   placing a second region of material in said high anisotropy magnetic material which forms said post elements that has a low anisotropy relative to said high anisotropy of said magnetic post elements, said second region placed in a corner of each quadrilaterally shaped post element opposite said first region of material wherein said second region may be used to switch said magnetic post element in addition to said first region.

2. A method for creating redundancy within a plurality of switchable magnetic post elements as claimed in claim 1, comprising the additional steps of:
   forming said post elements with first and second diagonals;
   forming said separations in said first direction to form generally vertical columns of said magnetic post elements;
   forming said separations in said second direction to form generally horizontal rows of said magnetic post elements;
   placing said first and second regions of material within opposite corners of alternate rows of said magnetic post elements along said first diagonals of said post elements; and
   placing said first and second regions of material within opposite corners of the remaining alternate rows of said magnetic post elements along said second diagonals of said post elements.

3. A method for creating redundancy with a plurality of switchable magnetic post elements as claimed in claim 2, wherein said step of arranging said separations in a grid-like pattern includes arranging said separations in an orthogonal pattern with said first and second directions arranged as vertical and horizontal directions.

4. A method for creating redundancy within a plurality of switchable magnetic post elements as claimed in claim 3, wherein said step of forming quadrilateral elements forms square elements.

5. A plurality of magnetic post elements as claimed in claim 1, wherein:
   said magnetic post elements and said nonmagnetic support are formed from transparent materials and said magnetic post elements are magneto-optic post elements for the transmission of electromagnetic energy.

6. A plurality of magnetic post elements as claimed in claim 1, wherein:
   said magnetic post elements of said high anisotropy material and said low anisotropy material are formed from transparent materials, and said magnetic post elements are magneto-optic post elements for the reflection of electromagnetic energy.

7. A magneto-optic device having redundant switching characteristics, comprising:
   a nonmagnetic substrate;
   a thin layer of transparent, magnetic material having high anisotropy with magnetic domain characteristics upon said substrate;
   orthogonal separations within said magnetic material forming a grid-like pattern having first and second sets of separations which divide said magnetic material into rows of quadrilateral post elements each having a first and second diagonal;
   conductors placed in alignment with said first and second set of separations;
   a first region of low anisotropy material when compared to said high anisotropy material located in one corner of each quadrilaterally shaped post element;

a second region of low anisotropy material when compared to said high anisotropy material located in another corner of each quadrilaterally shaped post element opposite said first region;

said first and second regions of low anisotropy material aligned along said first diagonals in alternate rows of said post elements; and said first and second regions of low anisotropy material aligned along said second diagonals in the remaining alternate rows of said magnetic post elements.

8. A magneto-optic device, as claimed in claim 7, wherein:

said first and second sets of separations are vertical and horizontal, respectively; and said quadrilateral post elements are square.

9. A magnetic device having a magnetic element upon a nonmagnetic substrate, comprising:

said magnetic element formed from a high anisotropy material;

a first region of low anisotropy material compared to said high anisotropy material located in one corner of said magnetic element;

a second region of low anisotropy material compared to said high anisotropy material located in an opposite corner of said magnetic element; and means for generating a first magnetic flux field in said one corner and a second magnetic flux in said opposite corner of said magnetic element to switch the direction of magnetization of said first and then said second region to thereby switch the direction of magnetization of said magnetic element from two corners.

10. A magnetic device as claimed in claim 9, wherein said substrate and magnetic element are transparent to electromagnetic energy.

11. A magnetic device as claimed in claim 9, additionally comprising:

reflective means; wherein said magnetic element of high anisotropy material and said first and second regions of low anisotropy material are transparent to electromagnetic energy so that said device functions as a reflective device.

* * * * *